United States Patent
Bartolini et al.

(10) Patent No.: US 12,486,135 B2
(45) Date of Patent: Dec. 2, 2025

(54) SYSTEM AND METHODS FOR THE CALCULATION OF ADDITIONAL LOCAL STRETCHING IN A WEB

(71) Applicant: VALMET AB, Sundsvall (SE)

(72) Inventors: Fabrizio Bartolini, Lucca (IT); Marco Capitani, Lucca (IT)

(73) Assignee: VALMET AB, Sundsvall (SE)

(*) Notice: Subject to any disclaimer, the term of this patent is extended or adjusted under 35 U.S.C. 154(b) by 181 days.

(21) Appl. No.: 18/291,708

(22) PCT Filed: Aug. 23, 2022

(86) PCT No.: PCT/EP2022/073372
§ 371 (c)(1),
(2) Date: Jan. 24, 2024

(87) PCT Pub. No.: WO2023/025743
PCT Pub. Date: Mar. 2, 2023

(65) Prior Publication Data
US 2025/0066153 A1    Feb. 27, 2025

(30) Foreign Application Priority Data
Aug. 24, 2021    (SE) ................... 2151019-3

(51) Int. Cl.
*B65H 26/06*    (2006.01)
*B65H 26/02*    (2006.01)
(Continued)

(52) U.S. Cl.
CPC ........... *B65H 26/066* (2013.01); *B65H 26/02* (2013.01); *G01N 21/8851* (2013.01);
(Continued)

(58) Field of Classification Search
CPC .. B65H 26/066; B65H 26/02; B65H 2220/01; B65H 2301/4143; B65H 2301/542;
(Continued)

(56) References Cited

U.S. PATENT DOCUMENTS

| 7,297,969 | B1 | 11/2007 | Wolinsky | |
|---|---|---|---|---|
| 2009/0028416 | A1* | 1/2009 | Floeder | G01N 21/89 382/141 |
| 2009/0088889 | A1 | 4/2009 | Hellstrom | |

FOREIGN PATENT DOCUMENTS

| EP | 2206666 A1 | 7/2010 |
|---|---|---|
| EP | 3466854 A1 | 4/2019 |
| EP | 3885744 A1 | 9/2021 |

OTHER PUBLICATIONS

International Search Report and Written Opinion for Patent Treaty Application No. PCT/EP2022/073372, dated Mar. 2, 2023, 18 pages.

\* cited by examiner

*Primary Examiner* — Jamil Ahmed
(74) *Attorney, Agent, or Firm* — Alston & Bird LLP (57) ABSTRACT

The present invention relates to systems and methods for calculating the additional local stretching of a moving web through a converting process in order, during rewinding, to find the position of defects in the web that were identified during winding and stopping the web with the web defect close to or at a defect correcting station. The method comprises, during rewinding of the web, the steps of detecting position markers (PM(n)) applied during winding of the web (5), measuring the distance between the position markers, calculating the additional local stretching between the position markers occurring during rewinding, applying the calculated additional local stretching to the known position of a following web defect to determine an estimated position (Continued)

of that web defect in the rewinding web. A method for correcting a web defect comprises the step of subsequently stopping the web with the web defect at, or close to, a defect repairing station (38).

20 Claims, 3 Drawing Sheets

(51) Int. Cl.
*G01N 21/88* (2006.01)
*G01N 21/89* (2006.01)

(52) U.S. Cl.
CPC ..... *G01N 21/8901* (2013.01); *G01N 21/8914* (2013.01); *B65H 2220/01* (2013.01); *B65H 2301/4143* (2013.01); *B65H 2301/542* (2013.01); *B65H 2408/23* (2013.01); *B65H 2511/17* (2013.01); *B65H 2511/24* (2013.01); *B65H 2553/45* (2013.01); *B65H 2553/51* (2013.01); *B65H 2557/62* (2013.01); *B65H 2801/84* (2013.01); *G01N 2021/8861* (2013.01); *G01N 2021/888* (2013.01); *G01N 2021/8917* (2013.01)

(58) Field of Classification Search
CPC ............ B65H 2408/23; B65H 2511/17; B65H 2511/24; B65H 2553/45; B65H 2553/51; B65H 2557/62; B65H 2801/84; G01N 21/8851; G01N 21/8901; G01N 21/8914; G01N 2021/8861; G01N 2021/888; G01N 2021/8917
See application file for complete search history.

SYSTEM AND METHODS FOR THE CALCULATION OF ADDITIONAL LOCAL STRETCHING IN A WEB

CROSS REFERENCE TO RELATED APPLICATIONS

This application is a National Stage Application, filed under 35 U.S.C. § 371, of International Application No. PCT/EP2022/073372, filed Aug. 23, 2022, which international application claims priority to and the benefit of Swedish Application No. 2151019-3, filed Aug. 24, 2021; the contents of both of which as are hereby incorporated by reference in their entireties.

BACKGROUND

Related Field

This invention relates to systems and methods for the determining the positions of previously identified features, for example defects, of a moving web as it undergoes a converting process. The system and method calculate the changes in local stretch in the moving web during the converting process. The calculated local stretch may be used during the converting process to calculate the new position of a feature in a web in relation to coded position markers on the stretched web. The invention also relates to systems and methods for correcting defects in a web and for slowing down or stopping the web when the calculated new position of the feature approaches a defect repairing station.

In web processing and converting, for instance paper making and winding rolls of paper, there is a need to locate and repair serious web defects, for instance holes or lumps, or web contamination such as chemical contaminants, e.g., oil, or foreign bodies such as metal fragments. For the sake of brevity, web defects and web contamination are collectively called web defects in the following. Such locating and correcting/repairing of defects (called repairing defects for brevity in the following) is particularly important if the paper roll is to undergo a subsequent coating or other converting operation, as even a small hole in the web may cause a sheet break which is time-consuming to rectify.

When a web defect is detected, for example during winding, by a web inspection system, it is important that the location of web defect on the web is determined and recorded so that this information can be subsequently used during a following converting process, such as rewinding, to stop the rewinder so that the web defect is positioned at a defect repairing station where operators can correct or repair the defect on the web. Printing systems may be used by the web inspection system to mark the web as it is being wound with a uniquely coded machine direction (MD) position marker (called coded position marker for brevity in the following) at predetermined distances from the origin of the web. These markers may be detected during inspection by position marker detectors and used to determine the machine direction (MD) position of the web defect from a position marker during the winding. The cross direction (CD) position of defects can be recorded by suitable sensors. These coordinates of the web defect with respect to the last identified coded position marker can be recorded electronically in a table or database or the like along with a description of the web defect.

When the web is subsequently rewound and the coded position marker immediately before the web defect is detected in the rewinder, either automatically or by an operator, the machine speed has to be reduced to a slow speed, to allow the operator to search for the web defect before finally stopping the rewinder at the web defect so it can be repaired.

A problem with such systems is that the coded position markers are applied when the web is being run at a first web speed, for example in a winder, in a first machine direction (the "winding direction") and with a first web tension, while the correction of web defects takes place when the web is being run at a second web speed, for example in a rewinder, in the opposite machine direction (the "rewinding direction") and with a usually different, second web tension. Such differences in running conditions mean that the web material may be stretched different amounts during the winding and rewinding runs so that distance between coded position markers can be different in the different runs and thus they no longer are the predetermined distance apart. A consequence of this is that during web defect correction in the rewinder where the position of a web defect is recorded as being a certain distance from a particular coded position marker on a web then the web may be stopped too early if the web has stretched in comparison to the first run, or it may be stopped too late if the length of the web has contracted in comparison to the first run. If the web is stopped in the wrong position, then the operator or web inspection system has to search for the web defect and then, having found the defect, move the web so that the defect is at a defect repairing station, thereby wasting time.

US20090028416 relates to a system using pairs of fiducial marks on a web to produce a scaling factor following a process performed on the web. This scaling factor is used to scale the position of any anomaly between the pair of fiducial marks for use in a following process.

BRIEF SUMMARY

This problem of compensating for differences in stretching between two processes performed on a web can be solved by a methods and systems for calculating the additional local stretching that a portion of a moving web has undergone and applying this calculated local stretching to the one or more following portions of the moving web in real time. In present invention, the term real-time means that calculations are made and are ready to be applied within an elapsed time period of less than one second after the necessary measurements of distances between a pair of coded position markers have been made. Preferably the calculations are made and are ready to be applied within a time period equal to or less than 0.5 seconds, more preferably equal to or less than 0.1 seconds, even more preferably equal to or less than 0.01 second and most preferably within equal to or less than 0.001 second after the necessary measurements have been made. Even if it takes as long as 1 seconds for a calculation to be ready for application to a web moving at, for example 10 m/s, then the web will only have moved 10 metres during this time and with a calculated local additional stretching of 5%, the new position of any defect which originally was at 10 metres from a coded position marker will at most be 50 cm from its original position. Such a system is provided with a web length sensor or sensors, such as linear encoders, which measure(s) the actual length of web which passes the sensor(s) and this actual length can be compared with the length of web which has been calculated by use of previously applied coded position markers on the web that have been detected as having passed the sensor position. The system is provided with software which calculates in real-time the amount of additional local stretching that the web material has undergone by performing a comparison between the actual length of material which has been measured by the additional sensor(s) and the calculated length of material which is determined by the number or identity of the coded position markers which have passed the position of the additional sensor(s). Such a simple calculation can be performed in the software in a very small fraction of a second and means that the result of the calculation is available for use before any significant length of the web from the next portion of the web has passed a subsequent defect repairing station. Thus, for example, if the predetermined distance between a first coded position marker and a second coded position marker was set at 100 metres during the first, winding run but during the subsequent second, rewinding run, the actual distance between the two markers was measured to be 105 metres, then the software would calculate that the additional local stretching (i.e. the stretching between just those two position markers) in the second run compared to the first run was 5%. In general, the process conditions causing stretching of a web do not change abruptly and the additional local stretching measured for adjacent sections of web will be substantially the same. This means that the additional local stretching calculated for a first section of web can be applied to the following section of web to calculate changes in the position of defects in the following section of web. Thus, the amount of additional local stretching of a first section of the web can be applied to the recorded position of a web defect in the following section of web and a new position of the web defect calculated. For example, if the web defect was recorded as being 60 m after a first coded position marker and 40 metres before a second coded position marker and the calculated local stretching of the web in the first section of the web immediately before said first coded marker in the second run was 5% greater than in the first run, then, using the calculated local stretching of 5% of the first section of the web, the calculated position of the web defect would be 63 m (105%×60) from said first coded position marker and 42 m (105%×40) from said second coded position marker. Of course, if, as is usual, the direction of web movement is in the opposite direction to that used when the web was being wound, the second coded distance marked would be detected before the first coded position marker so the software has to calculate the position of the web defect in the direction towards the first coded position marker from the second coded position marker. As the new distance between the first and second coded position markers is 105 m, the web defect would be 105−63=42 m from the second coded position marker in the direction towards the first coded position marker. The information relating to the calculated new distance of a defect from the second coded position marker may then be used during the same run to slow down or stop the web when the defect subsequently approaches a defect repairing station.

DETAILED DESCRIPTION OF VARIOUS EMBODIMENTS

Figure 1:
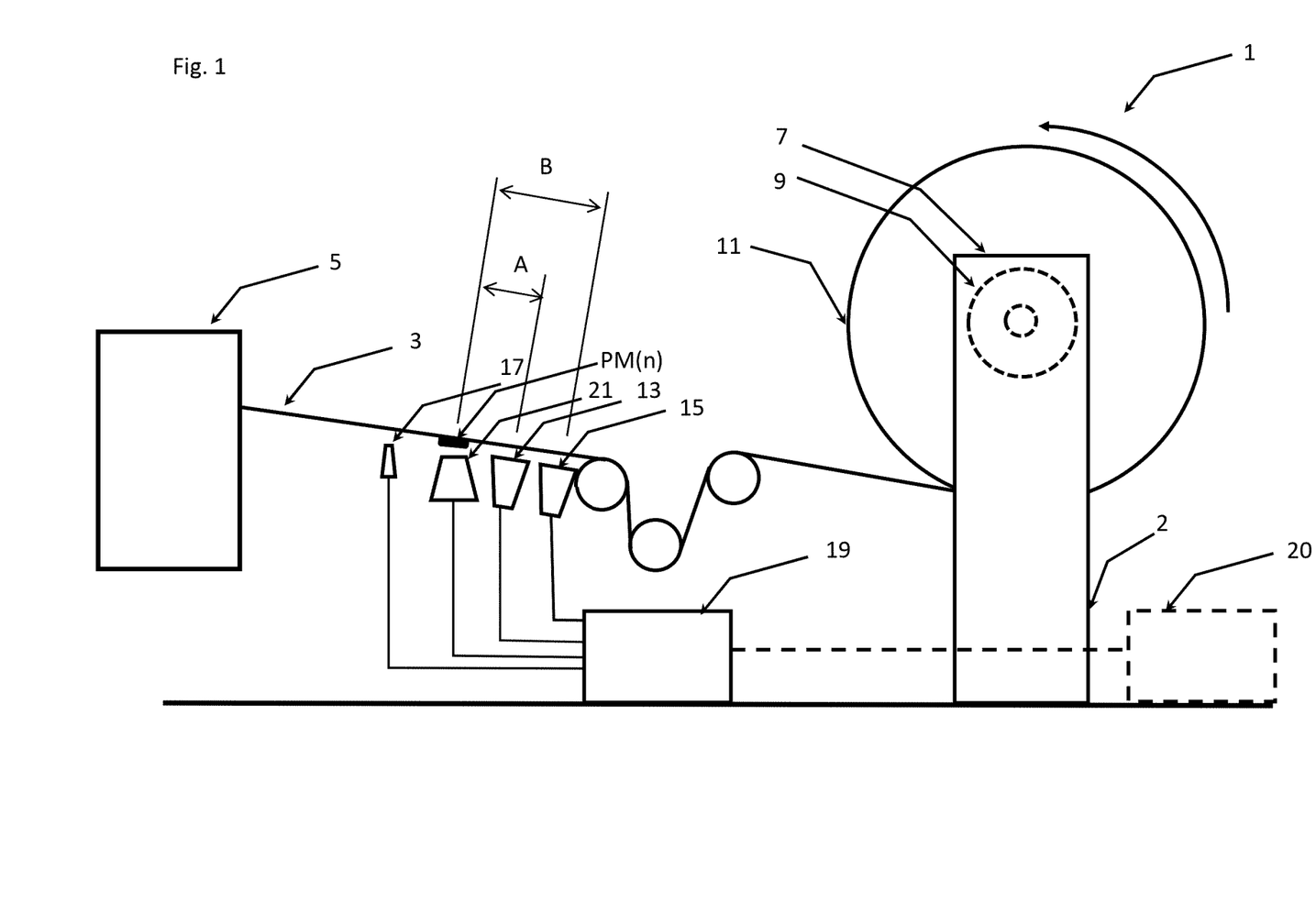
FIG. 1 shows schematically a lateral view of winder system for use in a system for calculating the additional local stretching in a web according to the present invention.

FIG. 1 shows schematically a winder system 1 with a winder 2 for winding a unique web 3 originating from a papermaking machine or other source of a web 5. The web 3 is wound onto a core 7 held on a rotatable shaft 9 in the winder and forms a reel 11. In order to be able to detect web defects for further correction, the web is inspected as it travels from the source of a web 5 to the reel. The inspection can comprise an optical defect detector such as a transverse linear scanner 13 which extends over the width (the cross direction "CD") of the web to detect visible web features for example defects such as holes, creasing and marks, and a transverse linear metal detector 15 which can detect web defects in the form of metal contamination of the web. These optical and metal detectors generate defect signals which contain information on the position of any detected web defect in the cross direction of the web. In order to be able to correct any web defect, the position of the web defect in the direction of travel of the web in the machine direction ("MD") must also be known. The system comprises a distance encoder, for example linear distance encoder 17, which measures the length of web in the winding machine direction which has passed the distance encoder. The encoder is connected to a control system 19 which can be any automated control system 19 such as a PC, analogue computer, control server or the like with appropriate control software or programming. The control system is operatively connected to a marking device 21, for example an ink marker, which can be operated to mark the web, preferably close to an edge, with a uniquely coded MD position marker (PM(L times n))) printed with a, preferably easily erasable, ink, such as an UV-erasable ink, at predetermined distances L, for example at every 100 m (i.e. L=100 m) of web that are measured by the distance encoder, in the winding machine direction. Each coded position marker gives the position of the marker in the MD direction from an origin which could be the start of the reel or other fixed point, for example the first applied marker. The web may be transported in the machine direction at a constant linear speed V m/s or at a continuously measured linear speed V(t) m/s. The optical defect detector is at a fixed distance A from the marking device and the metal detector is at a fixed distance B from the marking device. Thus, the time taken for each coded position marker to pass each of the detectors after being applied to the web is able to be calculated from the known values of V or V(t) and, similarly, the position of any individual web defect in the MD can be calculated from the time that has elapsed from the time of the latest being printed on the web to the time that that individual web defect is detected. For example, if the web is transported at 10 m/s in the MD direction and distance A is one metre, then it will take 0.1 second for a newly applied coded position marker to pass the optical defect detector. If at that speed an optically visible web defect (D1) is detected by the optical defect detector one second after the marking device has printed a coded position marker PM(1000) (corresponding to the position 1000 metres in the MD from the origin) and a signal indicating the CD position of the web defect and the time it was detected is sent to the control system, then, as the control device is provided with a clock and information relating to the linear MD speed of the web, the control system can calculate the web has travelled 10 metres from the marking device 21 in that one second. As the optical defect detector 13 is one metre in the machine direction away from the marker device, then the actual position of the web defect D1 is 1009 metres in the machine direction from the origin of the reel in the winding direction and 9 metres after the 1000 metre coded position marker (PM1000) in the winding direction. In other words, it is 91 metres before the 1100 metre coded position marker (PM1100) in the winding direction.

A similar calculation can be made for a metal web defect (D2) found by the metal detector. If the distance B is two metres, then at a web speed of 10 m/s it will take 0.2 seconds for a newly applied coded position marker to pass the metal defect detector. If a metal web defect (D2) is detected by the metal defect detector one second after the marking device has printed a coded position marker (PM1000) corresponding to the position 1000 metres in the MD, then the control system can calculate the web has travelled 10 metres from the marking device in that one second. As the metal defect detector 15 is two metres in the machine direction from the marker device 21 then the actual position of the metal web defect D2 is 1008 metres in the machine direction from the origin of the reel in the winding direction and 8 metres after the 1000 metre coded position marker in the winding direction. In other words, it is 92 metres before the 1100 metre coded position marker (PM1100) in the winding direction.

Thus, the control system is programmable to determine the position in the machine direction MD from the origin of the reel of any web defect found by the optical defect scanner or metal detector by using the speed of the web and the time difference between the time that any defect signal is sent to the control unit and the time that a marker was applied to the web. The position in the CD of the web defect can be given by the transverse position recorded in the defect signals for the optical defect detector and the metal detector.

The type of web defect, its CD position, and its MD distance from the origin of the web on the reel in the winding direction is preferably stored in a web defect log or list or database or the like for the uniquely identifiable reel being processed. This web defect log or the like can be stored on a system server 20 and associated with this uniquely identifiable reel for future use when correcting web defects in this uniquely identifiable reel 11.

Figure 2:
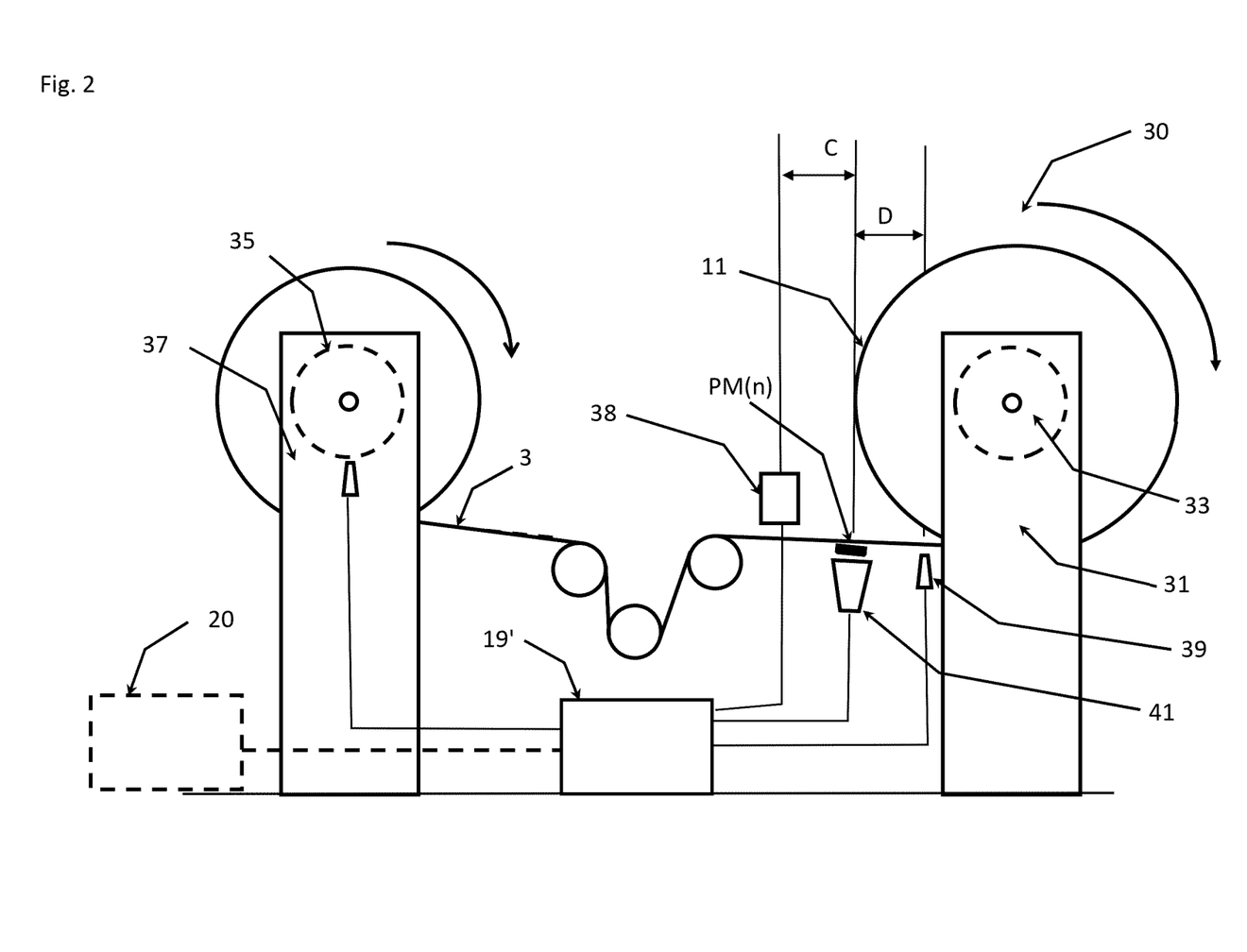
FIG. 2 shows schematically a lateral view of rewinder for use in a system for calculating the additional local stretching in a web according to the present invention.

A rewinder system 30 for rewinding a web is shown in FIG. 2 and comprises a rewinder 31 for a reel. In a system according to the present invention for calculating the additional local stretching of a web, the reel on the rewinder 31 is a uniquely identifiable reel upon which a unique web 3 has been wound using a winder system 1 of the type described above and where the position of web defects on the unique web have been recorded in a web defect log or the like associated with that uniquely identifiable reel. When this uniquely identifiable reel 11 is ready to be rewound in order to correct web defects, it is placed on the rotatable shaft 33 of the rewinder 31 which rewinds the unique web from this uniquely identifiable reel and feeds it to further processing devices, for example another core 35 in a further winder 37. Web defects in the unique web may be corrected or repaired at an automatic or user-operated defect repairing station 38. The rewinder is provided with a distance encoder, for example a linear distance encoder 39, which measures the length of the unique web in the rewinding machine direction which has passed the distance encoder and the encoder is connected to a control system 19' which can be any automated control system 19' such as a PC, analogue computer, control server or the like with appropriate control software or programming and which contains or has access to the web defect log or the like for the reel being processed. This access may be achieved by using the same control system 19, 19' for the rewinder and winder systems or, for example, storing the web defect log or the like on a server 20 which both the winder control system 19 and the rewinder control system 19' have access to. The defect log or the like with details of the type and position of defects may be provided on a movable storage medium which can be accessed by the control systems 19, 19'. The distance encoder 39 provides the control system with a signal which relates to the actual length of web which has passed the encoder.

The rewinder is provided with a coded position marker reader, for example an ink reader 41 at a linear distance D (e.g., one metre) in the machine direction from the distance encoder. The coded position marker reader is also at a linear distance C (e.g., one metre) before the defect correcting station 38. The ink reader detects each coded position marker as it passes the coded position marker reader and sends a signal to the control system whenever a coded position marker is detected. This signal contains information on the identity of the coded position marker, for example if it is the 1100 metre coded position marker (PM(1100)) in the winding direction. The control system is provided with software which registers the actual length (A1) of web which had passed the distance encoder at the time that every coded position marker, e.g., coded position marker PM(1100), was detected. When the next coded position marker is detected, for example the 1000 metre coded position marker PM(1000), by the ink reader, the control system registers the actual length of web A1, for example 110 metres, which had passed the encoder since the previous coded position marker, the 1100 metre marker, was detected. In this example the actual amount of web A1 which passed the encoder is 110 metres while the coded position markers nominally are only the distance L, which in this case is 100 metres, apart. This means that the web has been additionally stretched locally (i.e. between those two coded position markers) by 10 meters (10%) during rewinding. This amount of additional local stretching SL between two consecutive coded position markers, e.g., PM (n) to PM (n+L), is calculated by the control system and can be recorded for the portion of web P(n) between each pair of consecutive coded position markers. The amount of additional local stretching of the web during rewinding can be used directly by the control system to estimate where a web defect which was detected during winding actually is during this subsequent rewinding. For example, when, as mentioned above in the winding example, a web defect is 91 metres before the 1100 metre coded position marker in the winding direction, then, in the absence of any additional local stretching, it would be 91 metre after the 1100 metre coded position marker in the rewinding direction. If the additional local stretching SL in the portion of the web being unwound between the 1100 and 1000 coded position marker is a constant 10% then during rewinding the actual position of the web defect D1 will no longer be 91 metres after the 1100 portion marker but will be 91+9.1 (the additional 10% stretching)=100.1 metres from the 1100 coded position marker in the direction towards the 1000 coded position marker.

However, the additional local stretching LS of the portion (P(n)) of the web containing a web defect can only be found after the start coded position marker and end coded position marker (P(n) and P(n+L)) for the portion of web containing the web defect have both passed the ink reader. In practice this means that the position of a web defect could only be estimated after the coded position marker following the web defect has been detected by the ink reader. If the coded position markers are nominally 100 m apart then, in theory, the defect repairing station would have to be at least one hundred metres (plus a distance to compensate for any stretching in the web) from the ink reader in order to allow the additional local stretching to be calculated for the portion of web containing the web defect before it reaches the defect repairing station. This is impractical, and instead the control device uses the additional local stretching calculated for a preceding portion (portion P(n−(x*L))) of the web between two positions markers to estimate in real-time the additional local stretching for the actual portion (portion P(n)) of the web between two coded position markers that is being treated. Preferably the additional local stretching of a preceding portion of web is that of the portion of web between two positions markers immediately preceding the portion of web being treated (i.e., x=1) as this preceding portion of web is subject to very similar process conditions as the following portion of web and thus would be expected to undergo similar local stretching as the following portion of web. However, if the web is moving very quickly and there is a risk that defect which is at the start of the portion of web may already pass the defect repairing station before the new opposition of the defect can be calculated, then the additional local stretching from an even earlier portion of the web could be used to calculated the new position of a defect on the web which has undergone additional local stretching. A portion of web could be the part of the web between two consecutive coded position markers or it could be the part of the web between several position markers. While the greatest accuracy in estimating the local additional stretching for any portion (P(n) of the web is achieved by using the value of the additional local stretching calculated for the immediately preceding portion of the web (P(n−1)), it may be the additional local stretching of an earlier portion of web (i.e., x>1 for example P(n−2) or P(n−3), etc.)) or the average additional local stretching of two or more earlier portions of web between two coded position markers (e.g. the average value of the additional local stretching of the web portions P(n−1) and P(n−2). Indeed, the additional local stretching can also be calculated over longer portions of the web, for example the portion of web between a plurality of consecutive coded position markers, e.g., the portion between the preceding 3 or 4 or 5 or more coded position markers.

Figure 3:
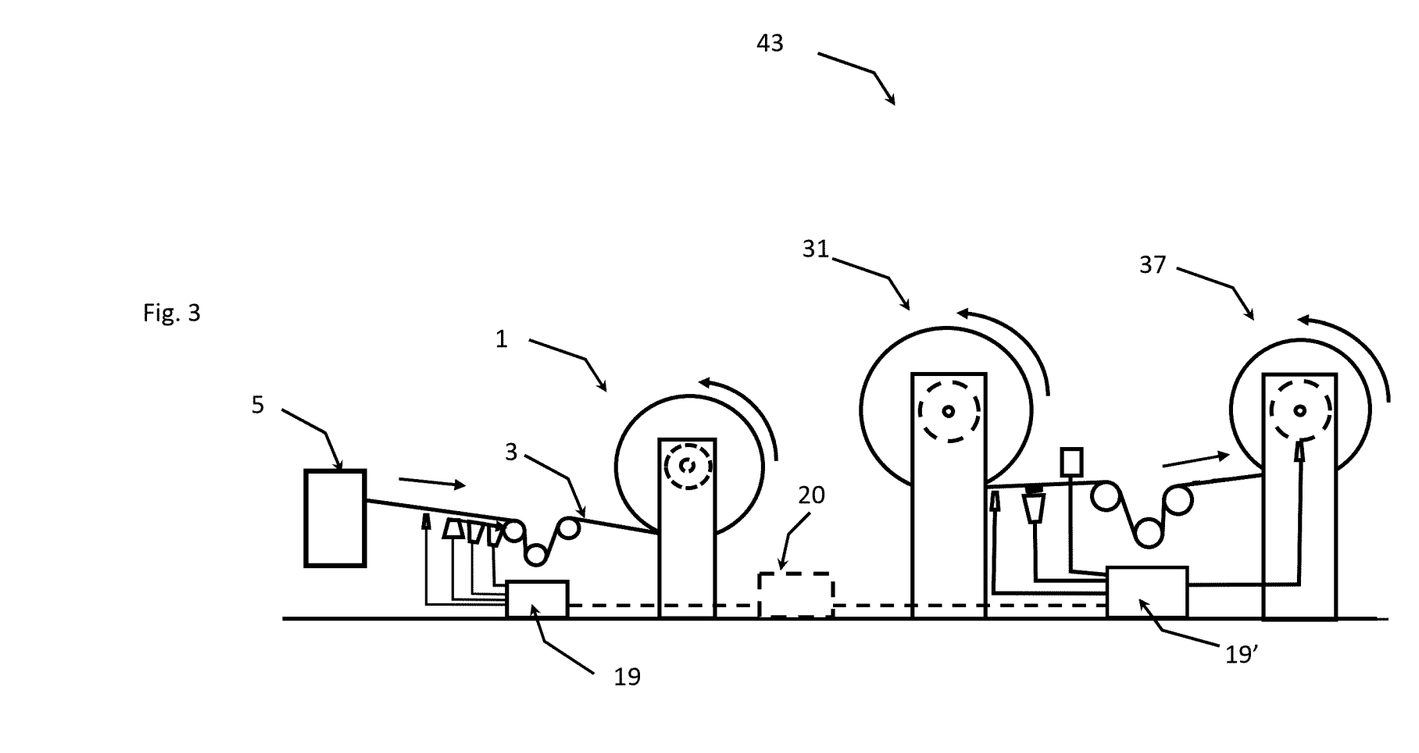
FIG. 3 shows schematically a system for calculating the additional local stretching in a web in accordance with an embodiment of the present invention.

FIG. 3 shows schematically a system for calculating the additional local stretching in a web 43 in accordance with an embodiment of the present invention comprising a winder and a rewinder in accordance with the present invention as described above.

This information regarding the estimated position of a web defect in relation to a unique coded position marker on the web which takes into account the additional local stretching of the web enables the system to estimate, in real-time (e.g. while a web is being rewound) during rewinding of the web and before the web reaches a defect repairing station, where a web defect is, and thereby, using information relating to the local additional stretching or contraction in the web, to stop the web so that the part of the web corresponding to the estimated position of the web defect is close to, or at, the defect repairing station. This reduces the time at which the machine needs to be operated at slow speed and/or reversed or stepped forward while searching for a web defect. Thus, using the distance for C and D mentioned above, when the defect repairing station 38 is 2 metres (distance D) from the distance encoder and only one metre (distance D minus distance C) from the ink reader then in order to stop the web so that the web defect, which is now estimated to be 100.1 metres from the 1100 metre coded position marker, is at the defect repairing station, the web should be stopped when it has travelled 101.1 metres after the 1100 metre coded position marker has been detected by the ink reader.

A method for calculating the additional local stretching of a moving web through a converting process comprises the following steps:
providing a moving web of material,
providing a control system,
marking the moving web with a plurality of coded position markers at predetermined intervals measured by a distance encoder, while winding the web on a reel,
rewinding the web from the reel, detecting coded position markers and measuring the distance between pairs of consecutive coded position markers,
using the control system to divide the measured distances between each said pairs of consecutive coded position markers by the predetermined distance between said each said pair of consecutive coded position markers to calculate in real-time the additional local stretching of the web between each said pair of consecutive coded position markers.

A further method for calculating the additional local stretching of a moving web through a converting process comprises the following steps:
providing a moving web of material,
providing a control system,
marking the moving web with a plurality of coded position markers at predetermined intervals measured by a distance encoder, while winding the web on a reel,
rewinding the web from the reel, detecting coded position markers and measuring the distance between pairs of coded position markers,
using the control system to divide the measured distance between the pairs of coded position markers by the predetermined distance between each pair of coded position markers to calculate in real-time the additional local stretching of the web between each pair of coded position markers.

A method for calculating in real-time the additional local stretching of a moving web during a converting process and using the calculated additional local stretching for estimating the position of a web defect in a web during rewinding comprises the steps of:
providing a moving web of material,
providing a control system,
marking the moving web with a plurality of coded position markers at predetermined intervals preferably measured by a distance encoder,
examining the web for web defects and recording the distance of each web defect from at least one coded position marker while winding the web on a reel,
rewinding the web from the reel, and during rewinding detecting position markers and measuring the distance between at least one pair of coded position markers,
using the control system to divide the measured distance between said at least one pair of coded position markers by the predetermined distance between said pair of coded position markers to determine the additional local stretching of the rewound web between said pair of coded position markers,
when approaching, or immediately after passing, the closest coded position marker before the web defect, multiplying the recorded distance of the web defect from said closest coded position marker by the additional local stretching of the web calculated for said at least one pair of coded position markers to determine the estimated position of the web defect in the machine direction on the rewinding web.

In such a method the pair of coded position marker may be consecutive position markers, or they could be a pair of coded position markers which are separated by one or more additional coded position markers. They may be the two coded position markers directly before the web defect in the current direction of travel or they may be other coded position markers before the web defect.

A method for positioning a web defect at a defect repairing station comprises the additional step of calculating when the estimated position of the web defect will be at a defect repairing station and stopping the web when the estimated position of the web defect is at the defect repairing station or is at a predetermined distance before the defect repairing station. Said predetermined distance may be less than or equal to two metres or less than or equal to one metre in order to allow an operator or automated device to detect and/or identify the defect before it reaches the defect repairing station.

A method of correcting a web defect comprises the additional steps of stopping the web so that the web defect is at the defect repairing station and correcting the defect.

An alternative method for calculating in the additional local stretching of a moving web during a converting process and using the calculated additional local stretching for estimating the position of a web defect in a web during rewinding comprises the steps of:
  providing a moving web of material,
  providing a control system,
  marking the moving web with a plurality of coded position markers at predetermined intervals, preferably measured by a linear distance encoder,
  examining the web for web defects and recording the distance of each web defect from the next following coded position marker while winding the web on a reel,
  rewinding the web from the reel and, during rewinding, detecting coded position markers and measuring the actual distance between at least one pair of coded position markers, using the control system to divide the actual measured distance between each said pair of coded position markers by the predetermined distance between said pair of coded position markers to determine in the additional local stretching of the unwinding web between said pair of coded position markers during rewinding,
  before approaching the coded position marker closest to the web defect, multiplying the recorded distance of the web defect from said coded position marker closest to the web defect by the additional local stretching of the web determined for said pair of coded position markers to determine the estimated position of the web defect in the machine direction on the rewinding web.

A method for positioning a web defect at a defect repairing station comprises the additional step of calculating when the estimated position of the web defect will be at the defect repairing station and stopping the web when the estimated position of the web defect is at or is at a predetermined distance before the defect repairing station. Said predetermined distance may be less than or equal to two metres and preferably is less than or equal to one metre in order to allow an operator or automated device to detect the defect before it reaches the defect repairing station.

A method of correcting a web defect comprises the additional steps of stopping the web so that the web defect is at the defect repairing station and correcting the defect.

Preferably a control system for the methods of the present invention comprises software running on a digital processing device such as a computer, a server or the like and the methods include the step of providing such software and digital processing device.

In some circumstances a coded position marker may be unusable because it has been damaged so that it is illegible or erased accidentally or even removed (for example if the operator removes a sample of the web for testing or because it is damaged, and the removed sample carried a coded position marker) or the like. For brevity in the following any coded position marker which is unusable is called an "unusable coded position marker". When an unusable coded position marker occurs, the defect repairing device will not be able to calculate the additional local stretching between the unusable coded position marker (UCPM) and the coded position marker (PM(UCPM−1)) immediately before the unusable coded position marker neither will it be able to calculate the additional local stretching between the coded position marker PM((UCPM+1)) immediately after the unusable coded position marker and the unusable coded position marker. In order to cope with such cases, a method for compensating for an unusable coded position marker may be provided in any method for calculating the additional local stretching of a moving web.

In order to avoid missing defects, in a method for compensating for an unusable coded position marker the software may be programmed with an upper limit for permissible additional local stretching. This upper limit may be determined in advance and preprogrammed into the software. An upper limit can for example be to set at any suitable value which is above the normally expected additional local stretching.

For example, if previous batches of material are known to tear or rupture when additional local stretching is greater than 10% then it is clearly impossible that the additional local stretching calculated by the system could be greater than 10%. In such a case, if during use the actual measured distance from a coded position marker exceeds that which would correspond to an additional local stretching of 10% and the following coded position marker has not been detected, then the system may apply the last previously calculated local additional stretch or apply a predetermined value for the local additional stretch (for example 8%, 5%, 0%, −5%, −8%) until two consecutively numbered coded position markers have been detected at an actual measured distance apart which corresponds to less than 10% additional local stretching. In this way errors that may be introduced by unusable coded position markers may be reduced.

The invention claimed is:

1. A method for calculating the additional local stretching of a moving web through a converting process comprises the following steps:
  providing a moving web (3) of material,
  providing a control system (19, 19'),
  marking the moving web with a plurality of coded position markers at predetermined intervals while winding the web on a reel (11),
  rewinding the web from the reel, detecting coded position markers and measuring the distance between pairs of coded position markers, and
  using the control system (19, 19'), within a time period equal to or less than one second after measuring the distance between said at least one pair of coded position markers, to divide the measured distance between each of said pairs of coded position markers by the predetermined distance between each of said pairs of coded position markers to calculate in real-time the additional local stretching of the web between each said pair of consecutive coded position markers.

2. A method for calculating in real-time the additional local stretching of a moving web through a converting process and using the calculated additional local stretching for estimating the position of a web defect in a web during rewinding comprises the steps of:
provided a moving web (5) of material,
providing a control system (19, 19'),
marking the moving web with a plurality of coded position markers at predetermined intervals,
examining the web for web defects and recording the distance of each web defect from at least one of the two closest coded position markers while winding the web on a reel (11),
rewinding the web from the reel (11), detecting coded position markers and measuring the distance between at least one pair of coded position markers, and
using the control system, within a time period equal to or less than one second after measuring the distance between said at least one pair of coded position markers, to:
divide the measured distance between said at least one pair of coded position markers by the predetermined distance between said pair of coded position markers to determine the additional local stretching of the rewound web between said pair of coded position markers; and
when approaching, or immediately after passing, the coded position marker before a web defect, multiply the recorded distance of the web defect from said coded position marker before a web defect, by said additional local stretching of the web determined for at least one pair of coded position markers to determine the estimated position of the web defect in the machine direction on the rewinding web.

3. A method for calculating in real-time the additional local stretching of a moving web through a converting process and using the calculated local stretching for estimating the position of a web defect in a web during rewinding comprises the steps of:
providing a moving web (3) of material,
providing a control system (19, 19'),
marking the moving web with a plurality of coded position markers at predetermined intervals,
examining the web for web defects and recording the distance of each web defect from at least the next following coded position marker while winding the web on a reel (11),
rewinding the web from the reel (11), detecting the coded position markers and measuring the distance between at least one pair of coded position markers, and
using the control system, within a time period equal to or less than one second after measuring the distance between said at least one pair of coded position markers, to:
divide the measured distance between each said pair of coded position markers by the predetermined distance between said pair of coded position markers to determine the additional local stretching of the rewinding web between said pair of coded position markers; and
when approaching, or immediately after passing, the coded position marker closest to a web defect, multiply the recorded distance of the web defect from the coded position marker before the web defect by the local additional stretching of the web determined for said pair of coded position markers to determine the estimated position of the web defect in the machine direction on the rewinding web.

4. Method according to claim 1, wherein said pair of coded position markers are consecutive potion markers.

5. Method according to claim 1, wherein said pair of coded position markers are separated by one or more additional coded position markers.

6. Method according to claim 1, wherein said method comprises a method for compensating for an unusable coded position marker by applying the last previously calculated local additional stretch or applying a predetermined value for the local additional stretch.

7. Method according to claim 1, wherein the method is performed in software on a digital processing device.

8. Method according to claim 1, comprising the further step of positioning a web defect at or near a defect repairing station by calculating when said estimated position of the web defect will be at the defect repairing station and stopping the web when the estimated position of the web defect is at the defect repairing station or is at a predetermined distance before the defect repairing station.

9. Method according to claim 8, wherein said predetermined distance is less than or equal to two metres.

10. Method according to claim 1, comprising the additional steps of stopping the web so that the web defect is at the defect repairing station and correcting the defect.

11. Method according to claim 1, wherein the digital processing device is a server.

12. Method according to claim 1, wherein said time period after measuring the distance between said at least one pair of coded position markers, is equal to or less than 0.5 seconds.

13. A system for calculating the additional local stretching in a web comprises a winder system (1), a rewinder system (30) and a control system (19, 19') provided with software adapted to perform the method of claim 1.

14. Method according to claim 2, wherein either:
said pair of coded position markers are consecutive potion markers, or
said pair of coded position markers are separated by one or more additional coded position markers.

15. Method according to claim 3, wherein either:
said pair of coded position markers are consecutive potion markers, or
said pair of coded position markers are separated by one or more additional coded position markers.

16. Method according to claim 2, comprising the further step of positioning a web defect at or near a defect repairing station by calculating when said estimated position of the web defect will be at the defect repairing station and stopping the web when the estimated position of the web defect is at the defect repairing station or is at a predetermined distance before the defect repairing station.

17. Method according to claim 3, comprising the further step of positioning a web defect at or near a defect repairing station by calculating when said estimated position of the web defect will be at the defect repairing station and stopping the web when the estimated position of the web defect is at the defect repairing station or is at a predetermined distance before the defect repairing station.

18. Method according to claim 2, comprising the additional steps of stopping the web so that the web defect is at the defect repairing station and correcting the defect.

19. Method according to claim 3, comprising the additional steps of stopping the web so that the web defect is at the defect repairing station and correcting the defect.

20. Method according to claim 2, wherein said time period after measuring the distance between said at least one pair of coded position markers, is equal to or less than 0.5 seconds.

* * * * *